United States Patent

Mulhall

[15] 3,706,447
[45] Dec. 19, 1972

[54] HEAT TREATMENT APPARATUS FOR THE TREATMENT OF SEWAGE AND OTHER SLUDGES

[72] Inventor: Kenneth George Mulhall, 2 Deer Barn Hill, Redditch, England

[22] Filed: Dec. 31, 1970

[21] Appl. No.: 103,123

[52] U.S. Cl. ............................... 263/37, 263/42 R
[51] Int. Cl. ............................................. F27b 5/02
[58] Field of Search ...................... 263/37, 38, 41, 42

[56] References Cited

UNITED STATES PATENTS 2,721,735   10/1955   Permann ............................... 263/41
3,467,503   9/1969   Juric ..................................... 263/41 X

*Primary Examiner*—John J. Camby
*Attorney*—Holman & Stern

[57] ABSTRACT

A sludge heat treatment apparatus is provided in which heating of the incoming raw sludge is effected by passing the sludge through a sludge conduit extending along a duct through which hot air and combustion products of a fluid fuel burner are caused to circulate. The temperature of the circulating air is controlled by a thermostat.

6 Claims, 1 Drawing Figure

PATENTED DEC 19 1972
3,706,447
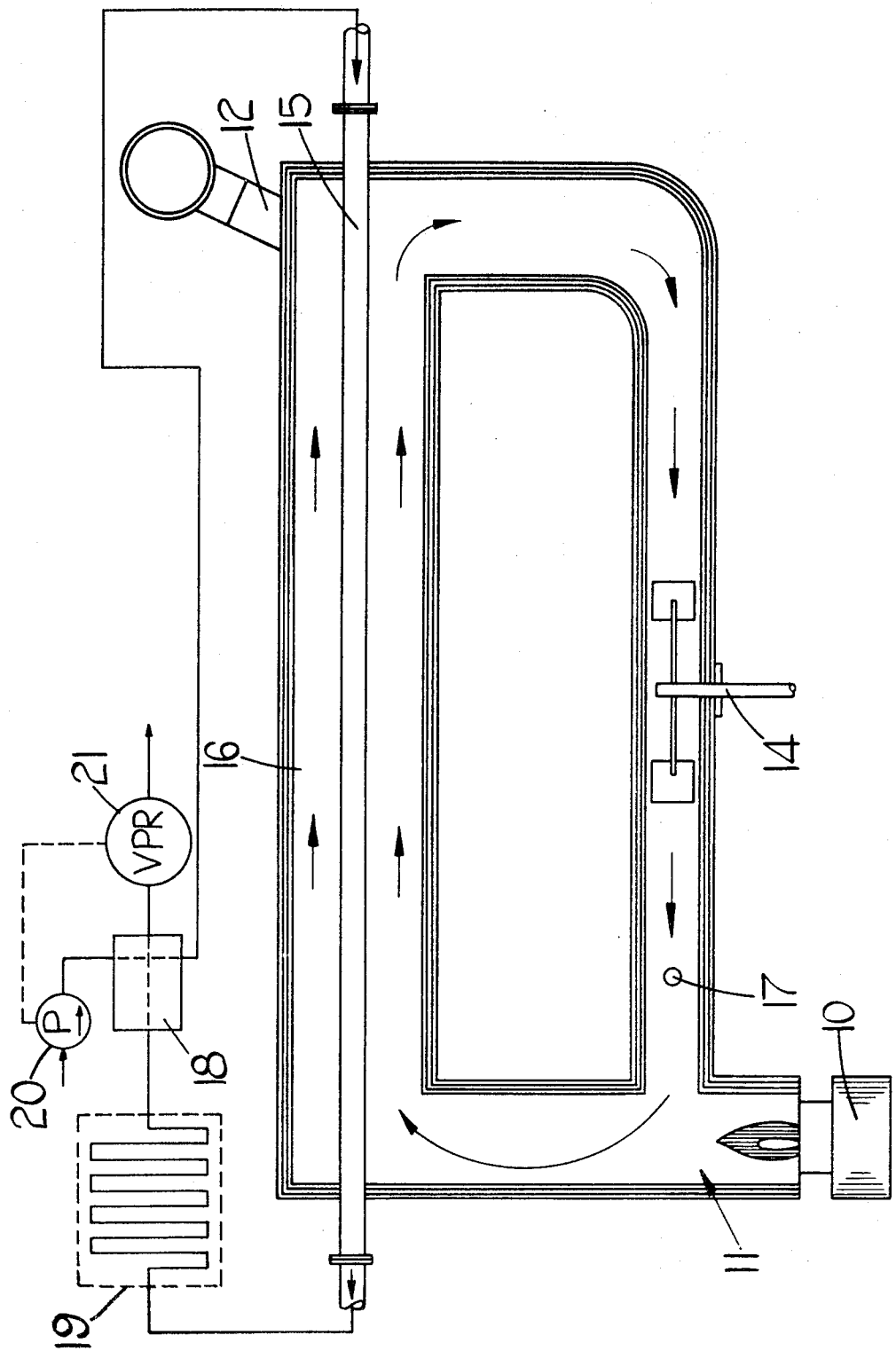
INVENTOR
Kenneth George Mulhall
Holman & Stern
ATTORNEYS

HEAT TREATMENT APPARATUS FOR THE TREATMENT OF SEWAGE AND OTHER SLUDGES

This invention relates to heat treatment apparatus for the treatment of sewage and other sludges of the kind comprising a heating device for heating incoming sludge to an elevated treatment temperature, for example 380° – 400°F, and a reaction vessel in which the sludge is maintained under pressure at said treatment temperature for a protracted period of say 30 minutes.

It is an object of the present invention to provide, in a heat treatment apparatus of the kind specified, a heating device in a convenient form.

In accordance with the invention in a heat treatment apparatus of the kind specified, said heating device comprises a fluid fuel burner arranged to fire into a duct through which air is caused to circulate in use, a sludge conduit extending through said duct at a position sufficiently removed from the burner to ensure that there is no impingement of flame therefrom on the sludge conduit and control means for controlling the fuel supply to the burner to maintain the temperature of the air circulating in said duct at a predetermined level.

In the accompanying drawing there is shown, diagrammatically and in section, one example of a heating device for incorporation into heat treatment apparatus in accordance with the invention.

The heating device shown includes a fluid fuel burner 10 which is arranged to fire into a closed loop duct 11 which has an outlet 12 to a chimney with a balanced damper arrangement. The outlet 12 is at a point in the loop opposite the burner 10 and is arranged to allow a small proportion of the air circulating around the duct to be displaced by the incoming air required for combustion. A paddle-type fan 14 is provided for circulating air through the duct, this fan being arranged to draw air from the part of the duct adjacent the the outlet 12 and deliver it to the part adjacent the burner 10.

Extending through the duct 11 is a conduit 15 for the sludge to be heated. This conduit enters the duct 11 adjacent the outlet 12 and extends along a leg 16 of the duct along which heated air flows from the burner 10 to the outlet 12. The conduit 15 is arranged so that it is sufficiently far removed from the burner 10 to ensure that there is no impingement of the flame therefrom on the conduit, a sufficient length of the duct being disposed between the burner 10 and the conduit 15 to ensure proper mixing of the recirculated air with the flame and products of combustion.

The temperature of the air in the duct between the fan 14 and the burner is sensed by suitable temperature sensor 17 which controls the fuel supply to the burner 10, to decrease the fuel supply when the air temperature increases above a predetermined level and to increase the fuel supply when the temperature falls below such level.

The conduit 15 may be provided externally with any suitable form of secondary heat transfer surface and the leg 16 of the duct 11 may include baffles and other flow directing devices to ensure that effective heat transfer occurs.

The heating device shown is employed to heat the sludge to the elevated treatment temperature i.e. 380°–400°F, after the incoming sludge has been preheated by indirect heat exchange in a heat exchanger 18 with treated sludge leaving the reaction vessel 19 to which sludge is passed from the heating device. The reaction vessel may be an elongated lagged duct along which the sludge undergoing treatment travels for thirty minutes.

A pump 20 provides the required pressure to pass the sludge through the apparatus and a pressure control device 21 maintains this pressure by opening and closing appropriately and shutting down the valve 20 if required as disclosed in detail in British Pat. Specification No. 1,129,361.

Having thus described my invention, what I claim as new and desire to secure by Letters Patent is:

1. A continuous flow sludge heat treatment apparatus comprising means for heating the sludge to an elevated treatment temperature, and a reaction vessel connected to the heating means for retaining the sludge under pressure at said treatment temperature for a protracted period, said heating means comprising a fluid fuel burner, an air circulation duct into which said burner fires, a sludge conduit extending through said duct at a position sufficiently removed from the burner to prevent flame impingment on the sludge conduit and control means for controlling the fuel supply to the burner to maintain the temperature of the air circulating in said duct at a predetermined level.

2. Apparatus as claimed in claim 1 in which said duct is in the form of a closed loop around which the products of combustion circulate.

3. Apparatus as claimed in claim 2 in which the duct has an outlet at a position opposite the burner, whereby a small proportion of the products of combustion in the duct is discharged from the circulating flow.

4. Apparatus as claimed in claim 2 in which there is a fan in the duct for assisting the circulation of the products of combustion.

5. Apparatus as claimed in claim 4 in which said fan is a paddle type fan.

6. Apparatus as claimed in claim 1 wherein said elevated treatment temperature is in the range of 380°–400°F and said protracted period for retaining the sludge under pressure at said treatment temperature is 30 minutes.

* * * * *